US008281655B2

(12) United States Patent
Bahorich et al.

(10) Patent No.: US 8,281,655 B2
(45) Date of Patent: Oct. 9, 2012

(54) FUEL GAUGING SYSTEM UTILIZING A DIGITAL FUEL GAUGING PROBE

(75) Inventors: Phillip Andrew Bahorich, Laguna Hills, CA (US); Victor Eisa, Reseda, CA (US); Michael Anthony Hessling, San Juan Capistrano, CA (US); Nalin Joshi, Playa Del Rey, CA (US)

(73) Assignee: Eaton Corporation, Cleveland, OH (US)

( * ) Notice: Subject to any disclaimer, the term of this patent is extended or adjusted under 35 U.S.C. 154(b) by 398 days.

(21) Appl. No.: 12/418,172

(22) Filed: Apr. 3, 2009

(65) Prior Publication Data

US 2010/0251816 A1    Oct. 7, 2010

(51) Int. Cl.
*G01F 23/26* (2006.01)

(52) U.S. Cl. ...................................... 73/304 C
(58) Field of Classification Search ......................... None
See application file for complete search history.

(56) References Cited

U.S. PATENT DOCUMENTS

| | | | |
|---|---|---|---|
| 2,866,337 A | 12/1958 | Minneman et al. | |
| 3,638,491 A | 2/1972 | Hart | |
| 3,747,407 A | 7/1973 | Wallman | |
| 3,864,609 A | 2/1975 | Di Giacomo | |
| 4,083,248 A | 4/1978 | Maier | |
| 4,262,531 A | 4/1981 | Hewitt et al. | |
| 4,296,472 A * | 10/1981 | Sarkis | 702/52 |
| 4,355,363 A | 10/1982 | Colby et al. | |
| 4,373,390 A * | 2/1983 | van Dyke et al. | 73/304 C |
| 4,388,828 A | 6/1983 | Dougherty | |
| 4,472,968 A | 9/1984 | Coates | |
| 4,589,077 A | 5/1986 | Pope | |
| 4,679,433 A | 7/1987 | Clinton et al. | |
| 4,888,989 A | 12/1989 | Homer | |
| 4,908,783 A | 3/1990 | Maier | |
| 4,918,619 A * | 4/1990 | Orloff et al. | 702/52 |
| 5,103,368 A * | 4/1992 | Hart | 361/284 |
| 5,103,672 A | 4/1992 | Terry, Jr. et al. | |
| 5,138,880 A | 8/1992 | Lee et al. | |
| 5,513,527 A * | 5/1996 | Griffiths | 73/149 |
| 5,566,572 A | 10/1996 | Pankow et al. | |
| 5,602,333 A | 2/1997 | Larrabee et al. | |
| 6,125,696 A | 10/2000 | Hannan et al. | |

(Continued)

FOREIGN PATENT DOCUMENTS

CN    2443351 Y    8/2001

(Continued)

OTHER PUBLICATIONS

Written Opinion of the Authorized Searching Authority (Corresponding Application: PCT/IB2010/000747); European Patent Office; Authorized Officer Erich Politsch; Issued Sep. 22, 2010 (7 pages).

(Continued)

*Primary Examiner* — Hezron E Williams
*Assistant Examiner* — Mark A Shabman
(74) *Attorney, Agent, or Firm* — Benesch, Friedlander, Coplan & Aronoff LLP

(57) ABSTRACT

A fluid measurement system utilizes one or more digital probes that communicate over a digital bus to a fluid gauging computer. The digital probes incorporate a capacitance to digital circuit that converts probe capacitance to a digital value. The digital value is communicated to the fuel gauging computer via a data bus.

19 Claims, 7 Drawing Sheets

U.S. PATENT DOCUMENTS

| | | | |
|---|---|---|---|
| 6,318,172 B1 * | 11/2001 | Byatt et al. ................. 73/304 C |
| 6,443,006 B1 | 9/2002 | DeGrave |
| 6,516,661 B1 | 2/2003 | Spillman, Jr. et al. |
| 6,571,625 B2 | 6/2003 | Thomson |
| 6,577,960 B1 | 6/2003 | Rabelo et al. |
| 6,777,956 B2 | 8/2004 | Davis |
| 6,857,313 B2 * | 2/2005 | Williamson ................ 73/304 C |
| 7,010,985 B2 | 3/2006 | Hauzeray |
| 7,415,366 B2 | 8/2008 | Florenz et al. |
| 7,533,566 B2 | 5/2009 | Tung et al. |
| 7,650,785 B1 | 1/2010 | Miskell et al. |
| 7,845,224 B2 | 12/2010 | Barlesi et al. |
| 2005/0197720 A1 * | 9/2005 | Morrison et al. ................. 700/2 |
| 2007/0055463 A1 | 3/2007 | Florenz et al. |
| 2010/0286933 A1 | 11/2010 | Boa |

FOREIGN PATENT DOCUMENTS

| | | |
|---|---|---|
| CN | 101038199 A | 9/2007 |
| CN | 101162212 A | 4/2008 |
| CN | 101713684 A | 5/2010 |
| CN | 101738240 A | 6/2010 |
| CN | 201697691 U | 1/2011 |
| EP | 0040107 B1 | 11/1981 |
| EP | 2183565 A1 | 9/2010 |
| EP | 2271949 A1 | 9/2010 |
| GB | 2059596 | 4/1981 |
| WO | 2006032309 A1 | 3/2006 |
| WO | 2006038787 A1 | 4/2006 |
| WO | 2009092330 A1 | 7/2009 |
| WO | 2010109317 A1 | 9/2010 |
| WO | 2010139974 A1 | 12/2010 |

OTHER PUBLICATIONS

International Search Report (Corresponding Application: PCT/IB2010/000747); European Patent Office; Authorized Officer Erich Politsch; Issued Sep. 22, 2010 (3 pages).

* cited by examiner

FUEL GAUGING SYSTEM UTILIZING A DIGITAL FUEL GAUGING PROBE

BACKGROUND

For safety and economic reasons, aircraft must have the capability of determining accurately the amount of fuel on board. Federal regulations determine the minimum amount of fuel which an aircraft must carry because unexpected events may alter the course and destination of the aircraft. In these situations it is important to have an accurate measurement of fuel remaining to enable the craft to be flown safely to an alternate destination.

The amount of fuel to be carried by an aircraft is determined by a variety of considerations, such as payload, route, weather, etc. The heavier the fuel load, the less payload an aircraft can carry, and error in fuel gauging is often accounted for by additional fuel reserves. Therefore, accurate on-board fuel gauging equipment is commercially desirable because it allows less fuel to be carried for a given route, resulting in a more economic flight operation.

Conventional fuel gauging systems have used capacitance probes located in the tanks of aircraft. Generally, such probes consist of two concentric vertically-disposed electrodes defining a space in which fuel rises during filling and falls during consumption. The level of the fuel within the probe alters the capacitance value of the probe. The capacitance of the probe varies linearly with the fuel level within the probe. Therefore, an electrical signal applied to the probe can be used to determine a probe capacitance value at a given fuel level. This capacitance value can then be used to determine the quantity of fuel in the tank.

In one type of commercially available fuel gauging system the capacitance of each probe is measured individually. Each probe is linear, i.e., the diameters of inner and outer electrodes remain constant throughout the length of the probe. Therefore, the probes are relatively inexpensive to manufacture. The integrity of each individual probe is monitored to detect probe failure. However, with such a system there is an increased complexity of the monitoring electronics and wiring. The additional wiring adds to the weight and cost of the system, and reduces system reliability. The electronics are more complicated because each probe must be driven separately in order to achieve a system reasonably responsive to fuel level changes. The added complexity makes such a system relatively more expensive and less reliable.

BRIEF DESCRIPTION OF THE DRAWINGS

It will be appreciated that the illustrated boundaries of components in the figures represent one example of the boundaries. One of ordinary skill in the art will appreciate that one component may be designed as multiple components or that multiple components may be designed as a single component. Additionally, an internal component may be implemented as an external component and vice versa.

Further, in the accompanying drawings and description that follow, like parts are indicated throughout the drawings and description with the same reference numerals, respectively. The figures may not be drawn to scale and the proportions of certain parts have been exaggerated for convenience of illustration.

DETAILED DESCRIPTION

Figure 1:
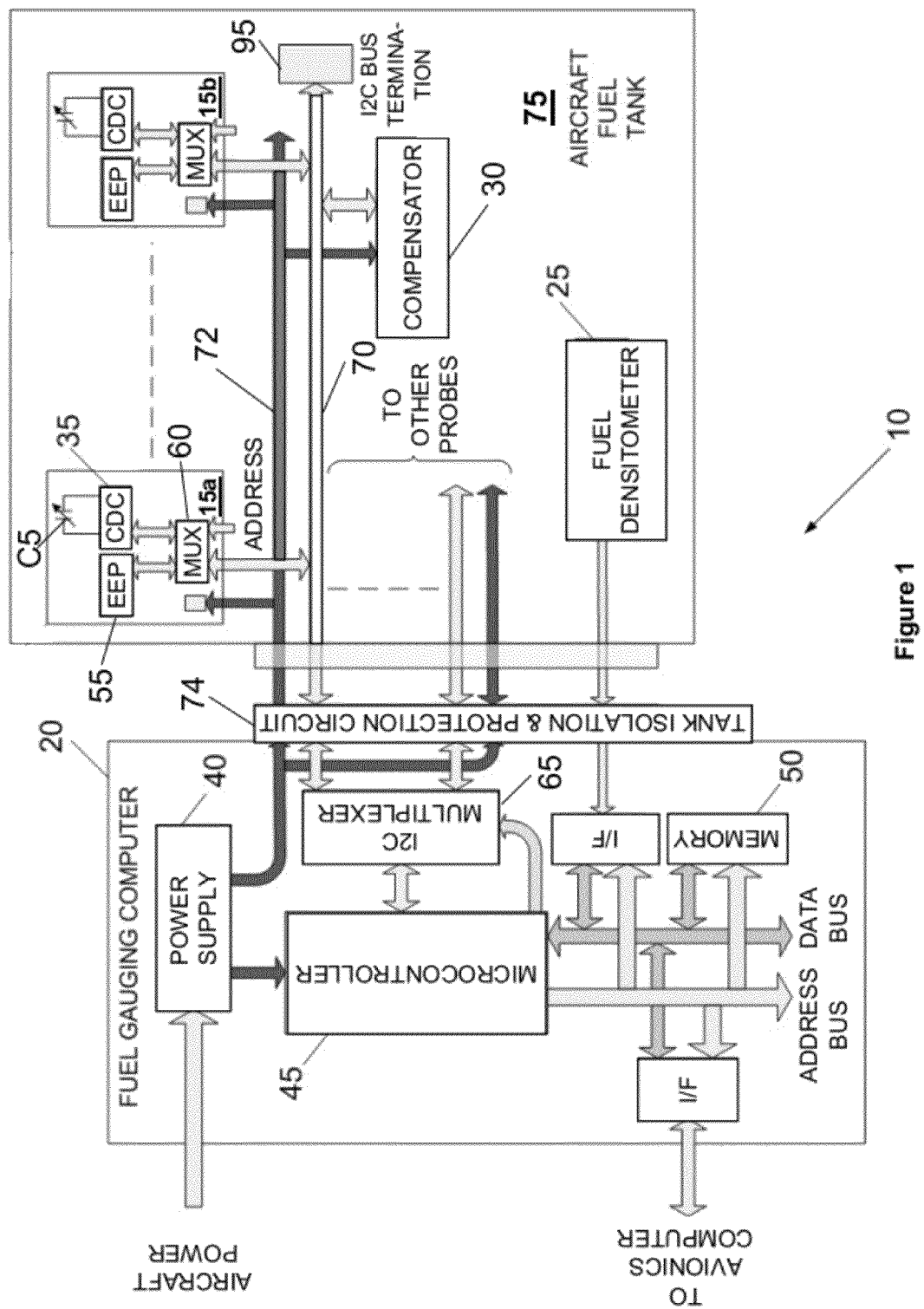
FIG. 1 illustrates a block diagram of one embodiment of a fuel gauging system.

Illustrated in FIG. 1 is a block diagram of one embodiment of a fuel gauging system 10 for use on an aircraft. Although this embodiment is discussed herein specifically in the context of aircraft fuel gauging, this discussion is merely for illustration and explanation purposes and should not be construed in a limiting sense. It will be appreciated that this fuel gauging system will have application to any liquid gauging application in which it is desired to determine the quantity of liquid in a container. For example, the fuel gauging system could be applied to any type of capacitance level sensing, including any type of liquid tank (e.g., fuel, oil, hydraulic, water, etc) in any type of vehicle (e.g., aircraft, rockets, ground vehicles) or even ground storage tanks of any type.

As shown in FIG. 1, example fuel gauging system 10 includes a plurality of addressable capacitive fuel gauging probes 15a and 15b (also referred to herein as the "probes 15") located in an aircraft fuel tank 75 and configured to provide an indication of fuel height in fuel tank 75, a remote fuel computer unit 20, a densitometer 25 located in fuel tank 75 or elsewhere in fuel system 10 and configured to measure the density of the fuel, and a liquid dielectric constant sensor or compensator 30 located in fuel tank 75 and configured to measure the dielectric constant or permittivity of the fuel. Specifically, the probes 15 are mounted vertically at various locations in fuel tank 75 so that they are at least partially immersed in any fuel present in fuel tank 75, while the compensator 30 is mounted at a location in fuel tank 75 that ensures that it will always be completely immersed in fuel. Typically, a liquid height-volume study is conducted during the design of a particular system in order to select an optimum set of locations for the minimum number of probes in each tank. In example system 10, two probes, 15a and 15b, are illustrated, but it will be appreciated that one probe or three or more probes may be used depending on the design.

In one embodiment, each fuel gauging probe 15 includes a capacitance-to-digital (CDC) circuit 35 that directly measures the capacitance of capacitor C5 and the temperature and impedance of fuel in tank 75, and converts the information into digital format. Each fuel gauging probe 15 in the example embodiment also includes a computer-readable medium represented in example system 10 by EEPROM 55. Fuel gauging probe 15 may be factory calibrated to provide virtually zero capacitance reading error. EEPROM 55 may contain the calibration parameters for fuel gauging probe 15. In the multiple fuel gauging probes 15 of the example embodiment a multiplexer 60 is included that receives, among other information, the capacitance value, the fuel tank temperature, and the fuel impedance measurement information from CDC circuit 35, and the calibration parameters from EEPROM 55.

Multiplexer 60 may be one of various known in the art, for example, a bi-directional translating multiplexer controlled via a data bus 70. Data bus 70 may be one of various known in the art (e.g. SPI, I²C, 1-Wire, and so on). Depending on the type of data bus, system 10 may include one or more termination networks 95. Termination network 95 may be necessary to eliminate signal reflection on the data bus 70 to ensure reliable data communication. The fuel gauging computer 20 receives the information from multiplexer 60 via data bus 70. A demultiplexer, here multiplexer 65 acting as a demultiplexer, receives the information from multiplexer 60 via data bus 70.

In addition to multiplexer 65, example fuel computer unit 20 may include a microcontroller 45, and a power supply 40 electrically connected to probes 15. Optionally, fuel computer unit 20 may also include a computer-readable medium, represented in system 10 by memory 50, to store, for example, program instructions and fuel tank characterization data. In an example embodiment, power supply 40 supplies power to the electronics in probes 15 via power bus 72.

Microcontroller 45 may receive the measurement information and calibration parameters from each of probes 15, and calculate the quantity (in volume and/or mass) of fuel in fuel tank 75 based on, for example, the measured capacitance of the probes 15, the measured temperature, the calibration parameters, the fuel's density as measured by densitometer 25, and the dielectric constant of the fuel measured by compensator 30, or combinations of this or other data. Once calculated, microcontroller 45 may communicate the fuel quantity to the avionics computer (not shown) via one of various known communication formats (e.g., Arinc 429, MIL-STD-1553, RS232, RS485, CAN, and so on) as required by the application. Ultimately, the fuel quantity is indicated on a fuel display or gauge (not shown) in, for example, the instrument panel of an aircraft cockpit. In an embodiment with a single probe 15, or an embodiment with multiple probes but where microcontroller 45 has multiple communication ports, multiplexers 60 and 65 may not be necessary where each probe 15 may communicate directly with microcontroller 45.

Microcontroller 45 can be one of a variety of commercially available microcontrollers or microprocessors. One suitable example of a microcontroller that can be used in the fuel gauging system 10 is the EZ-USB FX2LP™ USB Microcontroller (P/N CY7C68013A) manufactured and distributed by Cypress Semiconductor Corp. of San Jose, Calif. Another suitable example may be the PIC32MX series microprocessors from Microchip Technology, Inc. of Chandler, Ariz.

Microcontroller 45 may be electrically connected to, among other things, (i) the power supply 40 for controlling the power supplied to each probe 15 and the compensator 30, (ii) the probes 15 and compensator 30 for receiving digital signals that represent the capacitance and temperature values of each probe 15 and the compensator 30, and (iii) the optional densitometer 25 for receiving the measured density of the fuel. Based on, among other things, the measured capacitance and temperature of compensator 30, microcontroller 45 calculates the dielectric constant of the fuel, which will be described in more detail below. Based on, among other things, the dielectric constant of the fuel and the measured capacitance and temperature of probes 15, microcontroller 45 then calculates the quantity (in volume and/or mass) of fuel in fuel tank 75, which will be described in more detail below.

Although one embodiment of the fuel gauging system 10 described above utilizes a microcontroller to control power supply 40 and process the digital signals received from probes 15 and compensator 30, it will be appreciated that fuel gauging system 10 can utilize other types of microprocessors, computers, or functionally similar electronic hardware and software combination that are capable of performing these same functions.

In one embodiment, in addition to being electrically connected (directly or indirectly) to the fuel gauging probes 15 and compensator 30, power supply 40 is also electrically connected to microcontroller 45 for controlling the amount of power supplied to each probe 15 and compensator 30.

In one embodiment, data bus 70 and power bus 72 are electrically isolated and surge protected by tank isolation and protection circuit 74. Tank isolation and protection circuit 74 may isolate and protect circuitry in fuel tank 75 including electrical isolation (e.g. optoisolator, transformer, and so on), as well as protection against surges and transients due to lightning, static discharge, system operation or malfunction, and so on. In one embodiment, power supply 40 may supply AC power to the primary winding of an isolation transformer (not shown) in isolation and protection circuit 74, while the secondary winding of the isolation transformer supplies power to probes 15 in fuel tank 75 via power bus 72. Rectification of secondary winding AC power into DC may take place in each of probes 15, at a central location such as tank isolation and protection circuit 74 and DC power distributed to each of probes 15, and so on.

Fuel Gauging Probes

Figure 2B:
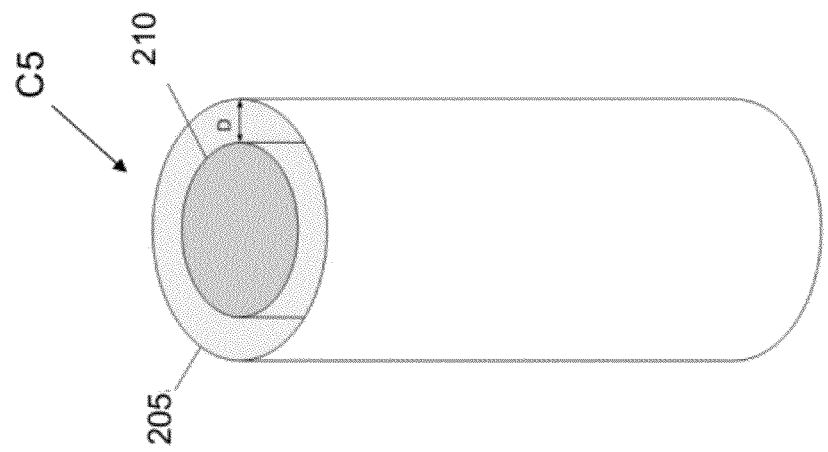
FIG. 2B illustrates a partial internal perspective view of one embodiment of a concentric plates capacitor in a fuel gauging probe that may be used in a fuel gauging system.
Figure 2A:
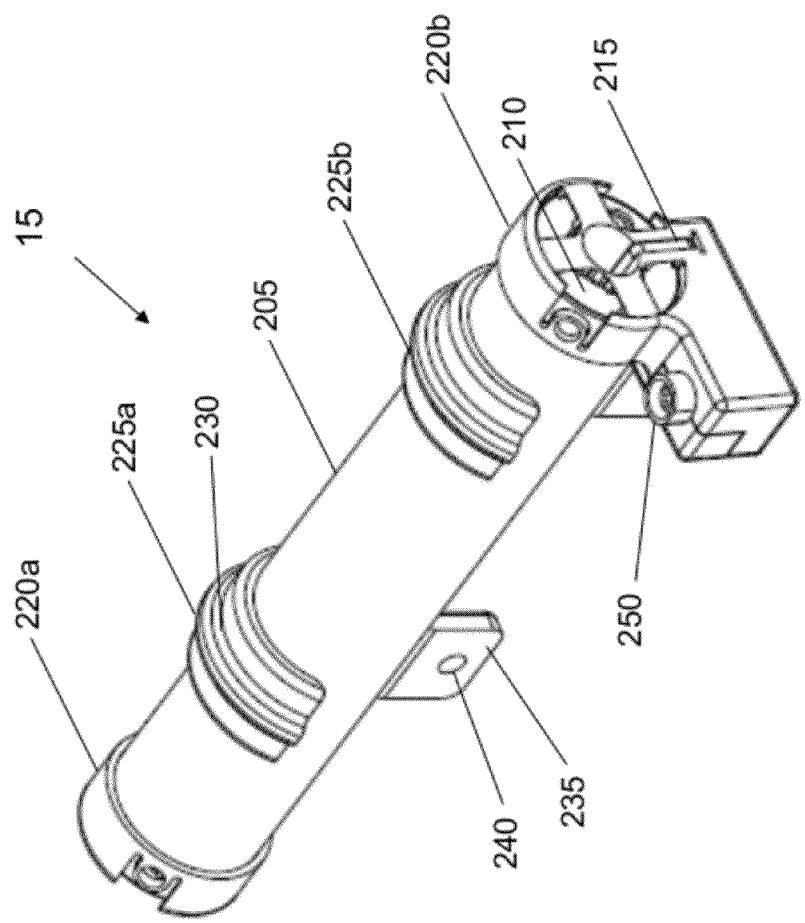
FIG. 2A illustrates a perspective view of one embodiment of a fuel gauging probe that may be used in a fuel gauging system.

FIG. 2A illustrates a perspective view of one embodiment of a fuel gauging probe also known as a capacitive sensing probe that may be used in a fuel gauging system. FIG. 2B illustrates a partial internal perspective view of one embodiment of a concentric plates capacitor C5 in a fuel gauging probe 15 that may be used in a fuel gauging system 10. In the example embodiment, probe 15 includes concentric plates capacitor C5 having two concentric tubes—outer tube 205 and inner tube 210—that act as capacitor electrodes. The outer and inner tubes 205, 210 are separated from each other by a constant distance D, which forms a gap between the outer tube 205 and the inner tube 210. The gap is filled with fuel to the same height, or equivalent, as fuel in fuel tank 75. The dielectric between the outer and inner tubes 205, 210 is constituted by air in the portion of the tubes that emerge above the fuel and by fuel in the portion of the tubes that is immersed in the fuel. Consequently, as the level of fuel rises or falls in fuel tank 75, the capacitance of each probe 15 varies as a function of the height of the fuel in fuel tank 75 and as a function of the dielectric constant of the fuel. In one embodiment, the dielectric constant of the fuel in fuel tank 75 may be actively determined by means of compensator 30 such that the calculated capacitance of each probe 15 will vary mostly as a function of the height of the fuel in fuel tank 75.

In prophetic embodiments, tubes 205 and 210 are not concentric, but simply inner related, where tube 210 is inside tube 205 although not concentric with tube 205. In this arrangement, distance D is not constant, but instead varies along the circumference of the tubes. In one embodiment, one or more of tubes 205 and 210 are not tubular, but instead may have cross-sections of different geometry (e.g. square, rectangular, oval, and so on). In another embodiment, the capacitor electrodes are not tubular and not inner related. In this example embodiment, the electrodes may be parallel plates with a gap between the electrodes for fluid to rise up to a certain level when the electrodes are inserted in a tank.

In one embodiment, the outer and inner tubes 205, 210 are constructed of aluminum. In other embodiments, the outer and inner tubes 205, 210 may be constructed of other suitable materials (e.g. composites, carbon fiber, and so on). In aircraft fuel gauging applications, one embodiment of probes 15 may have a length between approximately 3 and 15 inches and a diameter between approximately 0.5 and 2.0 inches. In other embodiments, probes 15 may have lengths shorter than 3 inches or longer than 15 inches and diameters smaller than 0.5 inches or larger than 2.0 inches.

In an example embodiment, to maintain the concentric relationship of the outer and inner tubes 205, and 210 and to electrically isolate the outer tube 205 from the inner tube 210, end caps 220*a* and 220*b* are provided on the ends of the outer and inner tubes 205, and 210. The end caps 220*a* and 220*b* may also serve to protect the outer and inner tubes 205, and 210 and prevent them from contacting the top and bottom of fuel tank 75. To ensure that rapid fuel level changes do not result in significant differences between the fuel levels inside and outside the probe 15, the end caps 220 have sufficient venting and draining capabilities. Additionally, the end caps 220*a* and 220*b* are designed so that air and water traps cannot be formed. The end caps 220*a* and 220*b* are constructed of a suitable isolating material that is capable of electrically isolating the outer tube 205 from the inner tube 210. In one embodiment, the end caps 220*a* and 220*b* are constructed of a polymeric material, such as Nylon or Teflon®. In other embodiments, the end caps 220*a* and 220*b* may be constructed of other suitable materials (e.g. isolating non-static producing polymers, and so on).

In one embodiment, to mount each fuel gauging probe 15 inside fuel tank 75, one or more mounting brackets 225*a* and 225*b* may be used. Each mounting bracket 225 may include a C-shaped portion 230 dimensioned to receive and capture the outer tube 205 and a flange portion 235 having one or more holes 240 for receiving a suitable fastener. Like the end caps 220*a* and 220*b*, the mounting brackets 225 may be constructed of a suitable isolating material that is capable of electrically isolating the mounting brackets 225 from the outer tube 205. In one embodiment, the one or more mounting brackets 225*a* and 225*b* are constructed of a polymeric material, such as glass filled Nylon or Teflon®. In another embodiment, the mounting brackets 225*a* and 225*b* may be constructed of other suitable materials (e.g. isolating non-static producing polymers, and so on).

As discussed above, each fuel gauging probe 15 may include a capacitance to digital circuit including capacitance-to-digital integrated or discrete circuits, multiplexers, memory, and so on, that is capable of directly measuring the capacitance of concentric plates capacitor C5 in fuel gauging probe 15. The capacitance to digital circuit converts the capacitance measurement to a digital signal. The capacitance to digital circuit can be positioned anywhere in, on, or adjacent the fuel gauging probe 15. In one embodiment, end cap 220*b* may house a printed circuit board (PCB) (not shown) on which to mount electronic components, which may include CDC circuit 35, multiplexer 60, EEPROM 55, an input/output connector 250, among other components.

In one embodiment, a flex harness 215 connected to or integral to a PCB mounted to end cap 220*b*. Flex harness 215 may connect to the electrodes, inner and outer tubes, of probe 15 such that a connection between circuitry on the PCB and the electrodes is established when the end cap 220*b* is mounted to the probe 15 tubes. In alternative embodiments (not shown), the electronic components can be mounted on a printed circuit board that is attached to opposite end cap 220*a*. In other embodiments (not shown), the electronic components can be mounted on a printed circuit board that is attached to mounting brackets 225*a* or 225*b*. In yet another embodiment (not shown), the electronic components can be mounted on a printed circuit board that is attached to an additional bracket that lacks mounting tabs.

Figure 3B:
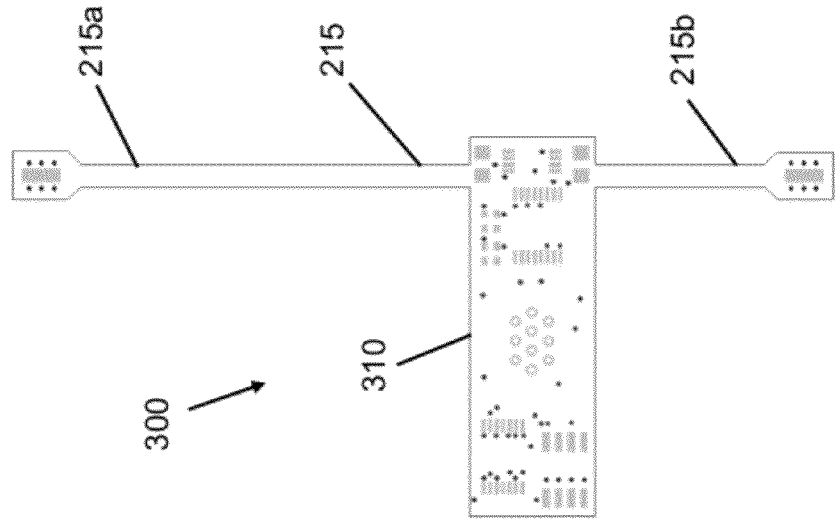
FIG. 3B illustrates an embodiment of a PCB/harness assembly 300.
Figure 3A:
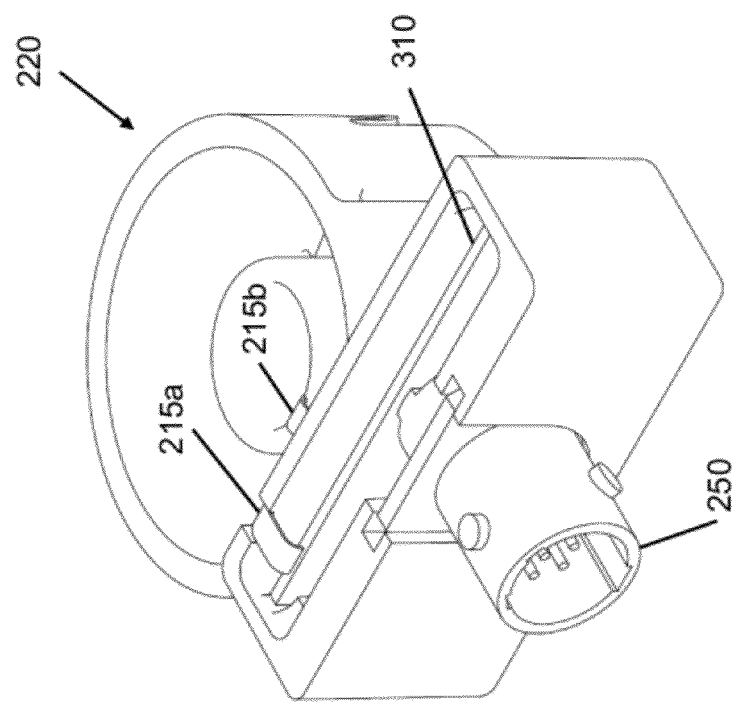
FIG. 3A illustrates a perspective view of an embodiment of an end cap 220 for use in a fuel gauging probe.

FIG. 3A illustrates a perspective view of an embodiment of an end cap 220 for use in a fuel gauging probe. FIG. 3B illustrates an embodiment of a PCB/harness assembly 300 where flex harness 215 has two ends 215*a* and 215*b* stemming from PCB 310. In the sample embodiment, when end cap 220 is mounted to a fuel gauging probe, one end 215*a* of flex harness 215 operably connects to the inner tube of the fuel gauging probe while a second end 215*b* connects to the outer tube, or viceversa.

Flex harness 215 may be operably connected to the electrode tubes of the fuel gauging probe, hence securing the electrical connection between circuitry on PCB 310 and the electrodes tubes, by pressure applied by the elasticity of end cap 220, by conductive epoxy, rivets, solder, and so on.

In one embodiment, PCB 310 is at least partially potted into end cap 220 leaving connector 250 exposed. In another embodiment, end cap 220 would be molded over PCB 310 and a portion of connector 250. In yet another embodiment, a terminal block may be used instead of connector 250.

Figure 4:
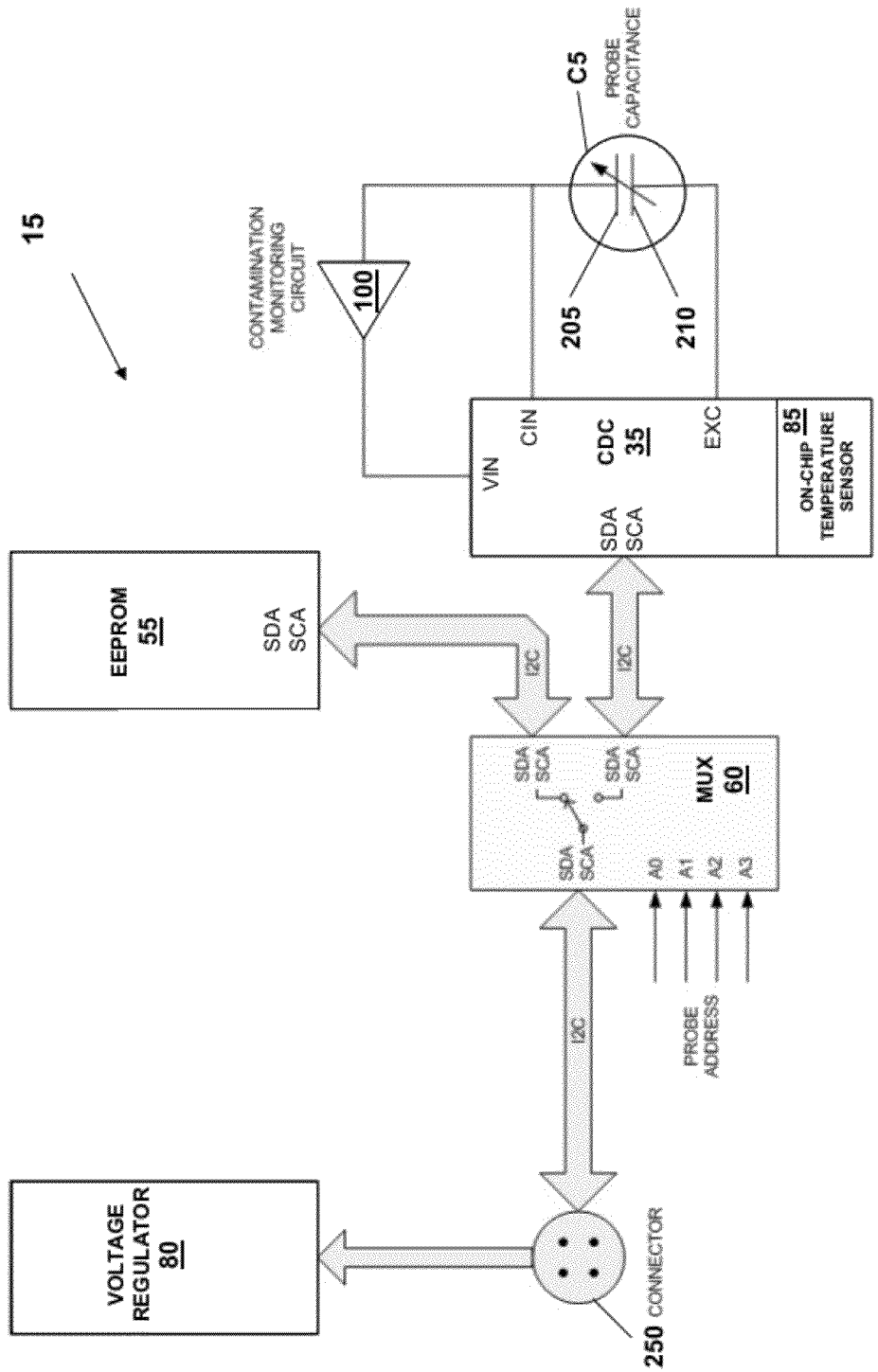
FIG. 4 illustrates a block diagram of one embodiment of a digital fuel gauging probe that may be used in a fuel gauging system.
Figure 5:
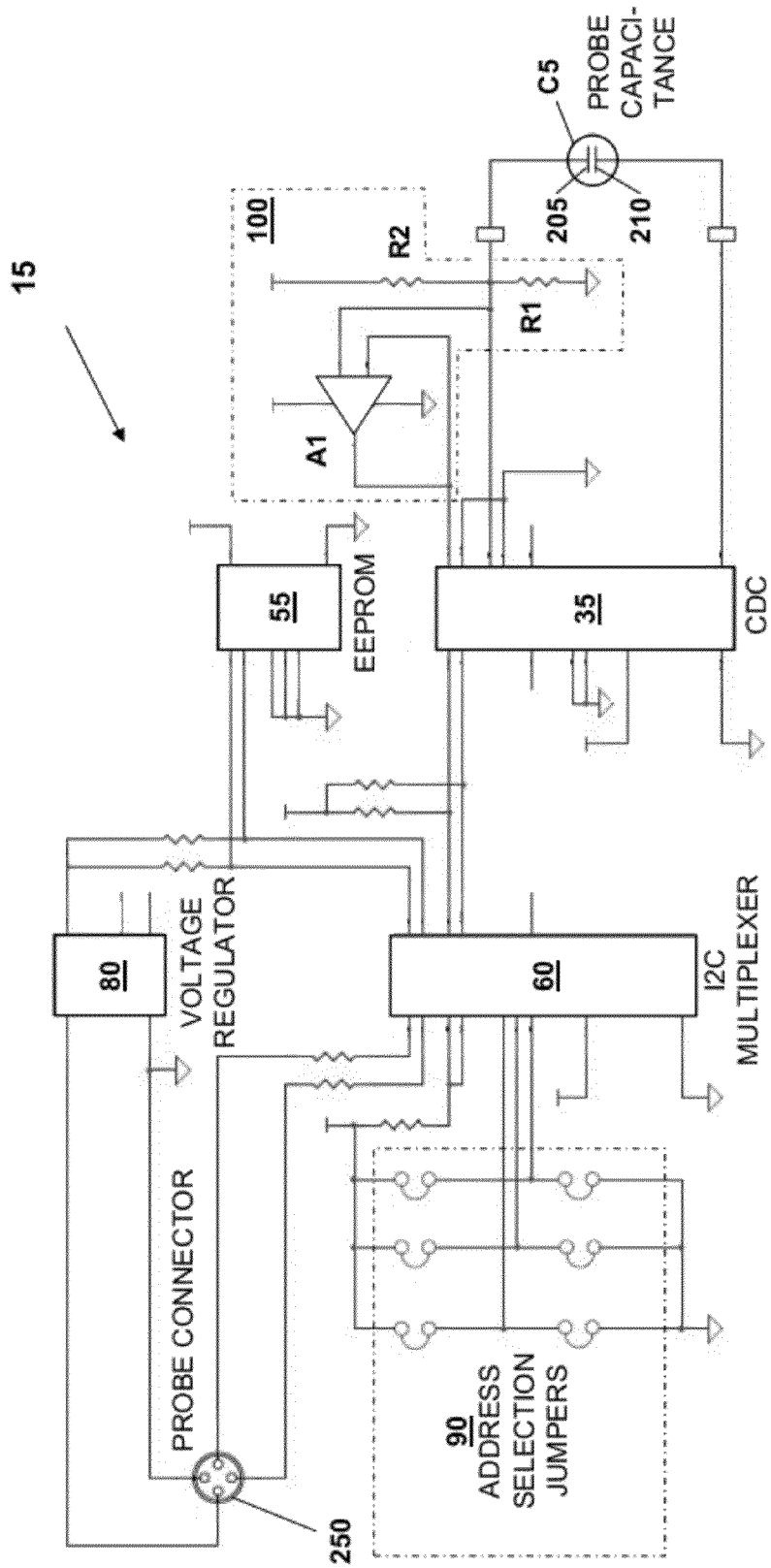
FIG. 5 illustrates a simplified schematic diagram of one embodiment of a digital fuel gauging probe.

FIG. 4 illustrates a block diagram of one embodiment of a digital fuel gauging probe 15 that may be used in a fuel gauging system 10. FIG. 5 illustrates a simplified schematic diagram of the embodiment. In the example embodiment, CDC circuit 35 is connected to multiplexer 60. EEPROM 55 is also connected to multiplexer 60. The serial interface clock input of multiplexer 60 is connected to connector 250. The bidirectional data serial interface of multiplexer 60 is also connected to connector 250. Together, these two lines (i.e., the serial interface clock input and the bidirectional data serial interface of multiplexer 60) constitute a serial interface connected to a data bus that carries all addressing, control, and measurement information (which includes the measured capacitance and temperature of each fuel gauging probe 15, the impedance of fuel in the tank, and calibration parameters stored in EEPROM 55) between the probes 15 and the microcontroller 45 of the fuel computer unit 20.

In the example embodiment, the power supply voltage input to probe 15 via connector 250 is connected to a voltage regulator 80. From voltage regulator 80, power is distributed to CDC 35, multiplexer 60, EEPROM 55, and other circuitry. Power is supplied to connector 250, and to the electronics in fuel gauging probe 15 from power supply 40 (FIG. 1). Connector 250 also has a connection to system ground. The connection to system ground may also serve as power supply return from fuel gauging probe 15 to power supply 40 (FIG. 1).

In the example embodiment, the capacitance-to-digital excitation voltage output of CDC circuit 35 may be connected to the inner tube 210 of concentric plates capacitor C5 via a low impedance conductor that serves to deliver excitation signals to inner tube 210. The capacitive input of CDC circuit 35 may be connected to the outer tube 205 of concentric plates capacitor C5 via a similar low impedance conductor that serves to deliver a signal proportional to the capacitance of concentric plates capacitor C5 for conversion to a digital signal by CDC circuit 35. The low impedance conductors may take various forms including shielded or unshielded cable, coaxial cable, a flex harness, and so on.

In one embodiment, probe 15 includes a temperature sensor 85. In the example embodiment, temperature sensor 85 may be on board CDC 35. In other embodiments, temperature sensor 85 does not necessarily need to be on-board CDC 35. Temperature sensor 85 may be a discrete temperature sensor installed at a location such that the temperature in the tank may be measured with relative accuracy. Wherever sensor 85 is installed, thermally conductive potting may be used around the sensor to ensure that the measured temperature accurately reflects the surrounding fuel or air temperature. In the example embodiment, temperature sensor 85 measures temperature, and CDC 35 communicates the measured temperature information to multiplexer 60 in digital format. Temperature sensor 85 may be factory calibrated to provide a high accuracy temperature measurement. The calibration parameters may be stored on board CDC 35, in EEPROM 55, or other computer-readable medium. The fuel temperature measured using temperature sensor 85 may be displayed in the cockpit of an airplane. The measured temperature may also be used in calculating fuel height, fuel density, fuel dielectric constant, and so on.

In one embodiment, probe 15 includes a contamination monitoring circuit 100. In the example embodiment, and best appreciated by reference to FIG. 4, contamination monitoring circuit 100 may comprise a resistor divider formed by resistors R1 and R2 with one end of the resistor divider connected to $V_D$, the other end connected to ground, and the center connection connected to probe capacitance C5 at the tube 205 terminal. Contamination monitoring circuit 100 may also include a buffer A1 with its input connected to the same point, probe capacitance C5 at the tube 205 terminal. The output of buffer A1 connects to the voltage input of an analog-to-digital converter in CDC 35. In between capacitance measurements, CDC 35 samples the voltage input of its analog-to-digital converter, in effect measuring the voltage at the center connection of the voltage divider formed by R1 and R2.

When fuel in the tank is not contaminated, the fuel impedance is very high. The fuel acts as an insulator, therefore very little current flows through capacitance C5 and the measured voltage at the voltage input of the analog-to-digital converter in CDC 35 is approximately $V_D(R1/R2+R1)$. However, if contamination (most commonly water) enters the fuel tank, the impedance of the contaminated fuel mixture would be lower than that of fuel alone, causing current through capacitor C5 to increase because the mixture acts less as an insulator. Thus, the measured voltage at the voltage input of the analog-to-digital converter in CDC 35 becomes different than $V_D(R1/R2+R1)$. Hence, the analog-to-digital converter in CDC 35 effectively measures the fuel impedance when it samples its voltage input in between capacitance measurements. CDC 35 may then communicate the measured impedance information to multiplexer 60 in digital format. The analog-to-digital converter in CDC 35 may be calibrated to provide a high accuracy measurement. The calibration parameters may be stored on board CDC 35, in EEPROM 55, or other computer-readable medium.

CDC circuit 35 converts the measured information to digital, and multiplexer 60 receives the measurement information. Multiplexer 60 may also receive calibration parameters from EEPROM 55, and the probe address from address selection jumpers 90.

Address selection jumpers 90 may be configured in the factory or during installation to uniquely identify each probe 15 via the set address. In the example embodiment, address selection jumpers 90 include six jumpers connected to three pins of multiplexer 60, two jumpers connected to each of the three pins to provide eight different addresses. A different number of pins in multiplexer 60 together with a different number of jumpers would provide a different number of unique addresses for a different number of fuel gauging probes 15. Addressing of fuel gauging probes may also be accomplished by various other methods including, for example, storing address information in EEPROM 55 or other computer-readable media.

In one example embodiment, CDC circuit 35 is Analog Devices, Inc.'s Model No. AD7745 24-Bit Capacitance-To-Digital Converter. CDC circuit 35 may be one of various other CDC integrated or discrete circuits known in the art.

Compensator

Figure 6:
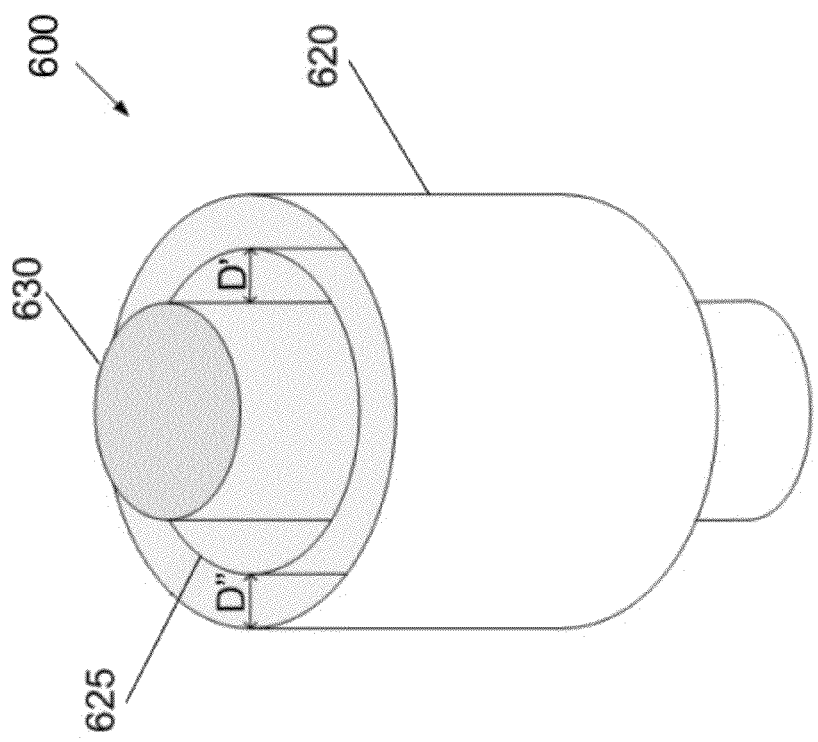
FIG. 6 illustrates a partial internal perspective view of one embodiment of a compensator probe that may be used in a fuel gauging system.

FIG. 6 illustrates a partial internal perspective view of one embodiment of a compensator probe 600 that may be used in a fuel gauging system. As discussed above, in an example embodiment, fuel gauging system 10 may include a liquid dielectric sensor or compensator 30 for determining the dielectric constant or permittivity of the fuel in fuel tank 75. It will be appreciated that fuel gauging system 10 does not necessarily have to include a compensator.

Example compensator 30 is equipped with a compensator probe 600 located in fuel tank 75 such that compensator probe 600 is fully emerged in fuel. Compensator probe 600 may be similar to the fuel gauging probes 15 discussed above and illustrated in FIGS. 2A and 2B. In one embodiment, if a fuel probe 15 is known to be fully submerged in fuel during all or most of a flight, the fuel probe 15 may be used as a compensator 30 at least until the fuel probe 15 is no longer fully submerged in fuel.

In an example embodiment, compensator probe 600 includes three concentric tubes—outer tube 620, middle tube 625, and inner tube 630—that act as capacitor electrodes to effectively form two capacitors. In the example embodiment, the middle and inner tubes, 625 and 630, are separated from each other by a constant distance D', which forms a gap between middle tube 625 and inner tube 630. The outer and middle tubes, 620 and 625, are separated from each other by a constant distance D'', which forms a gap between outer tube 620 and middle tube 625. Since compensator probe 600 is located in fuel tank 75 such that compensator probe 600 is fully emerged in fuel under most operating conditions, gaps D' and D'' should be fully filled with fuel under most operating conditions. In example compensator probe 600 the three concentric tubes 620, 625, and 630 with their respective gaps D', and D'' effectively form two capacitors with fuel as the dielectric.

When the two capacitors are connected in parallel, the capacitance of compensator probe 600 is higher than, for example, a single fuel probe 15. The increased capacitance may allow for shorter length tubes which may assist compensator probe 600 in being submerged in fuel under most operating conditions, even with very little fuel in the fuel tank. In one embodiment, the inner tube 630 may be longer than the other two tubes to facilitate probe mounting.

To maintain the concentric relationship and electrical isolation of each respective pair of outer/middle and middle/inner tubes, end caps (not shown) may be provided on the ends of the tubes. End caps may be constructed of a suitable isolating material similar to the isolating material from which the end caps 220 discussed above are constructed. To mount compensator probe 600 inside fuel tank 75, one or more mounting brackets (not shown) can be utilized. The mounting brackets can be constructed of a suitable isolating material similar to the isolating material from which the mounting brackets 225 discussed above are constructed.

In prophetic embodiments, compensator probes may be constructed in various other configurations other than concentric tubes including, for example, two independent capacitor probes, and so on.

The dielectric constant of fuel may vary with temperature and fuel type. Even at the same temperature, a batch of fuel of a fuel type may have a different dielectric constant than a second batch of the same fuel type. By measuring the parallel capacitance of capacitors in compensator probe 600 the dielectric constant of the fuel in fuel tank 75 can be calculated. Compensator 30 may include, in addition to compensator probe 600, a capacitance-to-digital converter (CDC) circuit that is capable of directly measuring the capacitances of compensator probe 600, and converting the capacitance measurements to digital signals.

The circuitry of compensator 30 can be positioned anywhere in, on, or adjacent compensator probe 600. For example, one of the mounting brackets (not shown) used to mount compensator probe 600 to fuel tank 75 can house the circuitry of compensator 30. In this example, the mounting bracket can include a printed circuit board (PCB) (not shown), to which the circuitry of compensator 30 is mounted, and an input/output connector. In an alternative embodiment (not shown), the mounting bracket can be molded over the PCB and a portion of the connector. In other embodiments (not shown), the circuitry of compensator 30 can be mounted on a printed circuit board that is attached to one of any end caps. In other embodiments (not shown), the circuitry of compensator 30 can be mounted on a printed circuit board that is attached to an additional bracket that lacks mounting tabs.

Probe/Compensator

In one embodiment, a gauging system may incorporate a probe/compensator comprised of a fuel probe portion for measuring fuel height and a compensator portion at the bottom of the probe/compensator for measuring the fuel dielectric constant. The fuel probe and compensator portions may be read independently by the fuel computer to measure the fuel height and dielectric constant at the same tank location, thus reducing the total number of mounting points and connections. In one embodiment, a probe/compensator would incorporate a two-channel CDC integrated circuit, making possible the individual measurement of the fuel height and the dielectric constant simultaneously.

Connection of Probes and Compensator to Fuel Computer Unit

Figure 7:
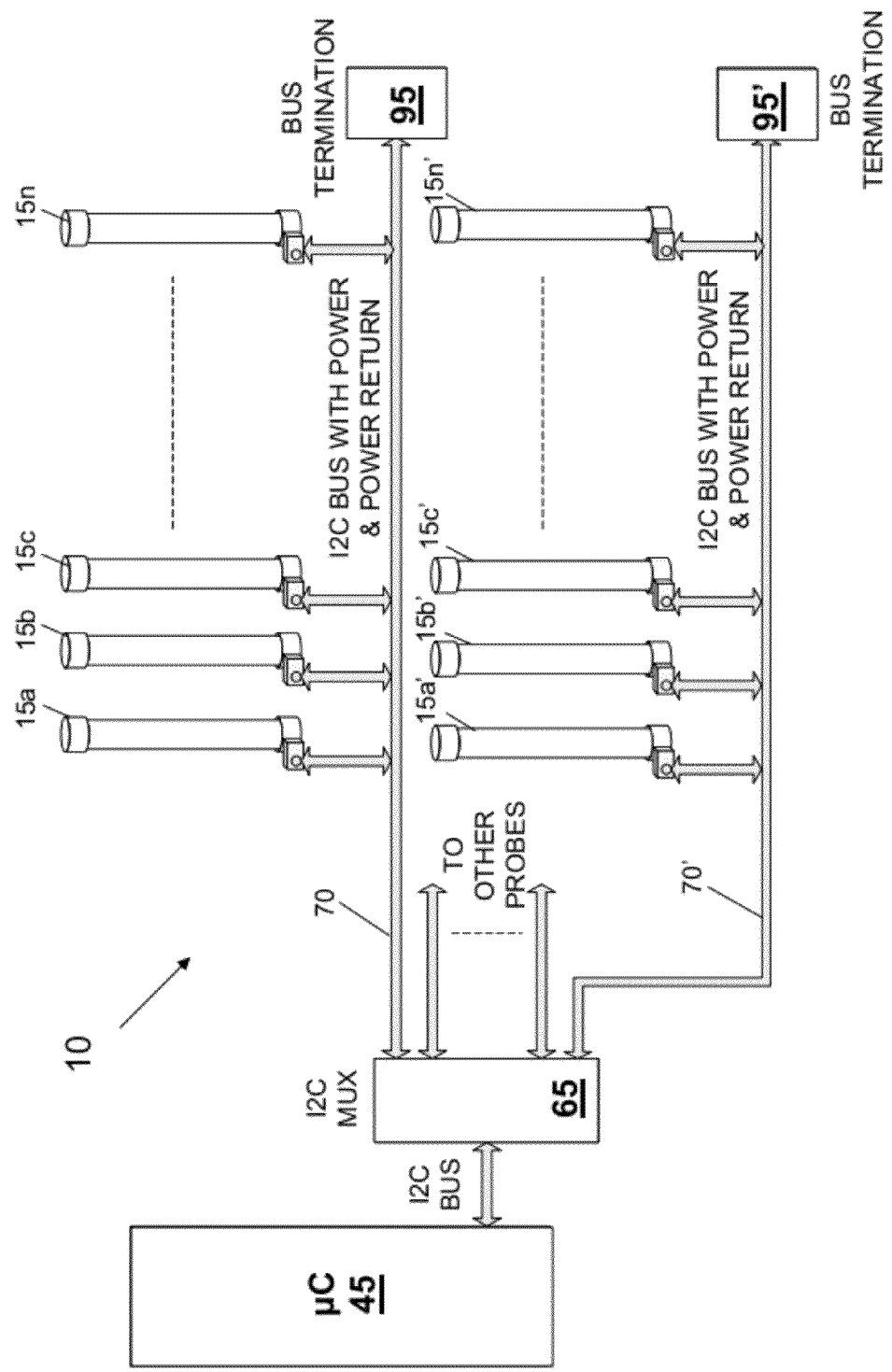
FIG. 7 illustrates a simplified bus multiplexing scheme for a fuel gauging system with digital fuel gauging probes.

With reference to FIG. 7, in an example embodiment, fuel gauging probes 15 connect to microcontroller 45 via one or more data buses 70 and 70'. In one embodiment, one group of probes 15a, 15b, 15c ... 15n may be connected to multiplexer 65 via data bus 70. A second group of probes 15a', 15b', 15c' ... 15n' may be connected to multiplexer 65 via data bus 70'. Multiplexer 65, in turn communicates demultiplexed data to microcontroller 45. It will be appreciated that this connection arrangement is only one example of various possible connection arrangements. Depending on the type of data bus, system 10 may also include one or more termination networks 95 and 95'. Termination networks 95 and 95' may be necessary to eliminate signal reflection on data buses 70 and 70' to ensure reliable data communication.

Operation of Fuel Gauging System

In one embodiment, during operation of the fuel gauging system 10, as discussed above and illustrated in the figures, the power supply 40 supplies power to each fuel gauging probe 15 and compensator 30. The CDC circuit 35 of each probe 15 directly measures the capacitance of each probe 15, while the CDC circuit 735 of compensator 30 directly measures the capacitance of compensator probe 600. The measured capacitances for the fuel gauging probes 15 and compensator probe 600 of the compensator 30 are then communicated in digital format to microcontroller 45 via data bus 70.

The measured capacitance of the probes is proportional to the change in wetted sensing length (WSL) or portion of the probe length wetted by the fuel and the dielectric constant of the fuel. Accordingly, the WSL may be computed using the formula:

$$WSL = L(C_M - C_E) / [C_{VAR}(K-1)] \qquad \text{Eq. 1}$$

where $C_M$ is the measured wetted probe capacitance, $C_E$ is a constant representing the empty or dry probe capacitance, $C_{VAR}$ is the capacitance added to the probe or compensator by covering it with a theoretical fuel having a dielectric constant exactly 2, so that K−1=1, K is the dielectric constant of the fuel at the measured temperature, and L is typically the length of the probe tube perhaps varied to adjust the slope of the probe WSL vs. $C_M$.

First, reference dielectric constant of the fuel in the tank, $K_{ref}$, is calculated using the compensator, compensator section of a probe/compensator, or fully covered fuel probe using the following equation:

$$K_{ref} = (C_M - C_E) / C_{VAR} + 1 \qquad \text{Eq. 2}$$

Then, K at each fuel probe may be determined using the formula:

$$K = K_{ref} + B_k(T - T_{ref}) \qquad \text{Eq. 3}$$

where $K_{ref}$ is a reference dielectric constant, $T_{ref}$ is a reference temperature constant, $B_k$ is a constant representing the slope of a K v. T plot. The above calculation is used for adjusting the dielectric constant to be more precise for the specific fuel tank or fuel probe location and to reduce error in determining the height (WSL) when the temperature at the fuel probe varies significantly from the temperature at the location (compensator, probe/compensator, or covered fuel probe) used to determine $K_{ref}$.

Next, using the measured capacitance of each fuel gauging probe 15 and the calculated dielectric constant of the fuel, the microcontroller 45 may calculate WSL for each probe 15 using Equation 1. The WSL for each probe 15 may then be converted by microcontroller 45 to a measure of partial fuel volume corresponding to each probe 15 based on the geometry of the fuel tank. Next, the microcontroller 45 may sum the partial fuel volumes computed for each probe 15 to obtain a total fuel volume for each fuel tank.

If fuel quantity in weight or mass (e.g., pounds) is desired, as opposed to fuel volume (e.g., gallons), the microcontroller 45 may calculate the weight or mass W of the fuel using the following formula:

$$W = V * \rho \qquad \text{Eq. 4}$$

where V is the total fuel volume for each fuel tank and $\rho$ is the density of the fuel in the respective fuel tank at the measured temperature. Total fuel quantity on board the aircraft can then be computed from the sum of the individual tank fuel quantity determinations. The fuel density may be measured by the densitometer 25 provided in fuel tank 75 or elsewhere in the fuel system. Alternatively, fuel density may be inferred through the measured dielectric constant of the fuel using traditional equations of density vs. fuel dielectric constant.

Since fuel temperature can vary significantly in different locations or compartments within a wing tank, it may also be desirable to adjust the fuel density in each compartment or at each fuel probe using the following formula:

$$\rho = \rho_{ref} + B_\rho(T - T_{ref}) \qquad \text{Eq. 5}$$

where $\rho_{ref}$ is a reference fuel density, $T_{ref}$ is the temperature of the fuel in the location that reference density is being measured, $D_\rho$ is a constant representing the slope of a $\rho$ v. T plot. The above calculation is used for adjusting the fuel density to be more precise for the specific fuel tank or fuel probe location and to reduce error in height (WSL) determination when the temperature at the fuel probe varies significantly from the temperature at the location (densitometer) used to determine $K_{ref}$. Alternatively, fuel density at each fuel probe or each compartment may be inferred using the traditional equations of density vs. fuel dielectric constant with the dielectric constant at each fuel probe or in each compartment first calculated using equation 3.

"Computer-readable medium," as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks, and so on. Volatile media may include, for example, optical or magnetic disks, dynamic memory, and so on. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic media, a CD-ROM, other optical media, punch cards, paper tape, other physical media with patterns of holes, a RAM, a ROM, an EPROM, a FLASH-EPROM, or other memory chip or card, a memory stick, a carrier wave/pulse, and other media from which a computer, a microcontroller, a microprocessor, or other electronic device can read.

An "operable connection," or a connection by which entities are "operably connected," is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection. Operable connections may also include pressure contact connections and connections secured by conductive epoxy, solder, rivets, and so on.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:

1. A fuel gauging system for use on an aircraft having a fuel tank, the system comprising:
    a fuel computer unit; and
    one or more fuel probes configured to be mounted in the fuel tank, each fuel probe having a body disposed inside the fuel tank and at least partially submerged in fuel, a submerged fuel probe forming a capacitor with fuel as the dielectric, each fuel probe having a capacitance-to-digital (CDC) circuit disposed on the body, such that the CDC is disposed inside the fuel tank,
    wherein the CDC is disposed on the body of the fuel probe for measuring the capacitance of the capacitor, converting the measured capacitance to a digital representation of the measured capacitance, encoding the digital representation of the measured capacitance into a digital signal, and communicating the digital signal to the fuel computer unit for the fuel computer unit to calculate a quantity of fuel in the fuel tank based, at least in part, on the measured capacitance.

2. The fuel gauging system of claim 1, where at least one of the one or more fuel probes comprises a temperature sensor for measuring temperature, converting the measured temperature to a digital representation of the measured temperature, encoding the digital representation of the measured temperature into the digital signal.

3. The fuel gauging system of claim 2, wherein a reference fuel dielectric constant is adjusted based on the measured temperature.

4. The fuel gauging system of claim 3, wherein an inferred fuel density is adjusted based on the adjusted fuel dielectric constant.

5. The fuel gauging system of claim 2, wherein a reference fuel density is adjusted based on the measured temperature.

6. The fuel gauging system of claim 1, wherein the CDC circuit is disposed within an end cap, and wherein the CDC circuit is operably connected to the capacitor, at least in part, via a flex harness.

7. The fuel gauging system of claim 1, further comprising a densitometer operably connected to the fuel computer unit for determining the density of the fuel in the fuel tank.

8. The fuel gauging system of claim 1, further comprising a compensator configured to be mounted in the fuel tank and be submerged in fuel forming one or more compensator capacitors with fuel as the dielectric, the compensator having a compensator capacitance-to-digital (CDC) circuit for measuring the capacitance of the one or more compensator capacitors, converting the measured capacitance of the one or more compensator capacitors to a digital representation of the measured capacitance of the one or more compensator capacitors, encoding the digital representation of the measured capacitance of the one or more compensator capacitors into a compensator digital signal, and communicating the compensator digital signal to the fuel computer unit for the fuel computer unit to calculate a dielectric constant of the fuel in the fuel tank based, at least in part, on the measured capacitance of the one or more compensator capacitors.

9. The fuel gauging system of claim 8, the compensator comprising a temperature sensor for measuring a temperature, converting the measured temperature to a digital representation of the measured temperature, encoding the digital representation of the measured temperature into the compensator digital signal, where the fuel computer unit calculates the dielectric constant of the fuel in the fuel tank based, at least in part, on the measured temperature.

10. The fuel gauging system of claim 1, wherein each of the fuel probes includes a fuel probe portion and a compensator portion, and wherein the CDC is a multi-channel capacitance-to-digital circuit (CDC) for measuring capacitance of the compensator portion and the probe portion independently, converting the measured capacitances to digital representations of the measured capacitances, encoding the digital representations of the measured capacitances into the digital signal, where the fuel computer unit calculates dielectric constant and fuel quantity at one single vertical location within the fuel tank, based, at least in part, on the measured capacitances.

11. An apparatus for use in a tank containing a liquid, the apparatus comprising:
a probe configured to be mounted in the tank for at least partial immersion in the liquid, the probe comprising concentric tubes, each concentric tube being disposed inside the fuel tank; and
a capacitance-to-digital (CDC) circuit disposed on the probe in the tank, such that the CDC is disposed inside the fuel tank and is operably connected to the concentric tubes for directly measuring capacitance and converting the measured capacitance to a digital signal output.

12. The apparatus of claim 11, wherein the CDC circuit is disposed within an end cap of the probe and a harness operably connects the CDC circuit to the concentric tubes in the probe.

13. A fluid measurement system comprising:
a set of addressable capacitive sensing probes configured to be mounted in a fluid tank at locations for immersion in a fluid;
a set of circuits, each circuit being disposed on one of the set of addressable capacitive sensing probes, each circuit being configured for determining a value corresponding to a capacitance of the capacitive sensing probe and for converting the value to a digital signal, where the capacitance varies depending on a fluid level within the fluid tank;
a path of electrical communication to each of the set of addressable capacitive sensing probes; and
a computer that selectively addresses over the path of electrical communication a determined first one of the addressable capacitive sensing probes and obtains a first digital signal therefrom, the computer determining a dielectric constant of the fluid based on the first digital signal, where the computer selectively addresses over the path of electrical communication others of the set of addressable capacitive sensing probes and obtains corresponding digital signals therefrom, where the computer determines a fluid measurement based on data including the determined dielectric constant of the fluid and the corresponding digital signals from others of the set of addressable capacitive sensing probes.

14. The fluid measurement system of claim 13, further comprising a densitometer configured to measure the density of the fluid.

15. The fluid measurement system of claim 13, further comprising a temperature sensor configured to sense temperature of the fluid.

16. The fluid measurement system of claim 13, further comprising a power supply configured to supply power to the set of addressable capacitive sensing probes via the path of electrical communication or a power supply path.

17. The fluid measurement system of claim 16, the power supply operably connected to the computer for the computer to control, at least in part, power supplied to one or more addressable capacitive sensing probes of the set of addressable capacitive sensing probes.

18. The fluid measurement system of claim 13, each addressable capacitive sensing probe having associated therewith a memory for storing initialization data comprising one or more of calibration data and an addressable capacitive sensing probe address, where the computer obtains the initialization data over the path of electrical communication and determines the fluid measurement based, at least in part, on the initialization data.

19. The fluid measurement system of claim 13, each capacitive sensing probe comprising two or more tubes in concentric or inner relationship, where adjacent tubes of the two or more tubes are separated by a distance which forms a gap between the adjacent tubes for the fluid to enter the gap up to a height equivalent to the fluid level within the fluid tank, where a dielectric between the adjacent tubes is constituted by air in a first portion of the gap that emerges above the height and by the fluid in a second portion of the gap that is immersed in the fluid, where the concentric or inner relationship is maintained by one or more caps located at one or more ends of the tubes or along the tubes, each capacitive sensing probe comprising one or more mounting brackets, each of the one or more mounting brackets including a first part shaped to receive an outer tube from the two or more tubes and a second part having means for mounting the capacitive sensing probe in the fluid tank, and where the one or more caps or the one or more mounting brackets contain the circuit.

* * * * *